(12) United States Patent
Ozawa

(10) Patent No.: US 6,985,260 B1
(45) Date of Patent: Jan. 10, 2006

(54) APPARATUS AND METHOD FOR DRAWING A GRADIENT FILL OBJECT

(75) Inventor: Shuji Ozawa, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 811 days.

(21) Appl. No.: 09/668,459

(22) Filed: Sep. 25, 2000

(30) Foreign Application Priority Data

Sep. 27, 1999 (JP) .................................. 11-272950

(51) Int. Cl.
  *H04N 1/40* (2006.01)
  *H04N 1/407* (2006.01)
  *H04N 1/409* (2006.01)
  *G06K 15/00* (2006.01)

(52) U.S. Cl. ...................... 358/3.26; 358/1.9; 358/521; 382/282; 382/283

(58) Field of Classification Search ................. 358/1.9, 358/3.3, 3.31, 453, 538, 3.01, 3.23, 539; 382/194, 282, 283
See application file for complete search history.

(56) References Cited

U.S. PATENT DOCUMENTS

| | | | | |
|---|---|---|---|---|
| 4,975,860 A | * | 12/1990 | Kitaya et al. .................. 358/1.9 |
| 5,093,869 A | * | 3/1992 | Alves et al. .................. 382/199 |
| 5,347,618 A | * | 9/1994 | Akeley .................. 345/421 |
| 5,923,822 A | * | 7/1999 | Takahashi .................. 358/1.9 |
| 5,926,185 A | * | 7/1999 | Vyncke et al. .................. 345/619 |
| 6,201,550 B1 | | 3/2001 | Sakamoto .................. 345/442 |

FOREIGN PATENT DOCUMENTS

| | | |
|---|---|---|
| JP | 4-306499 | 10/1992 |
| JP | 9-259258 | 10/1997 |
| JP | 9-272252 | 10/1997 |
| JP | 11-25282 | 1/1999 |

* cited by examiner

*Primary Examiner*—Thomas D. Lee
*Assistant Examiner*—James A. Thompson
(74) *Attorney, Agent, or Firm*—Fitzpatrick, Cella, Harper & Scinto

(57) ABSTRACT

To allow high-speed image data generation processing by shortening time required to generate an object having a predetermined gradation pattern over a number of lines in the vertical or horizontal direction in gradient fill object drawing processing, an image processing apparatus of this invention detects the number of lines of gradation in the horizontal or vertical direction, calculates only the first line of detected gradation, copies the calculation value of the first line, and embeds it in the second and subsequent lines, thereby shortening time required to generate objects of the second and subsequent lines and allowing high-speed generation processing.

5 Claims, 9 Drawing Sheets

CONVENTIONAL DRAWING METHOD OF EXPRESSING GRAYSCALE

DRAWING METHOD OF EXPRESSING GRAYSCALE USING RECTANGULAR GRADIENT FILL OBJECT

GRAY LEVEL : 50
GRAY LEVEL : 255
APEX 1 $(x_1, y_1, c_1)$
APEX 2 $(x_2, y_2, c_2)$

DRAWING METHOD OF EXPRESSING GRAYSCALE USING TRIANGULAR GRADIENT FILL OBJECT

GRAY LEVEL : 120
GRAY LEVEL : 255
GRAY LEVEL : 50
APEX 1 $(x_1, y_1, c_1)$
APEX 3 $(x_3, y_3, c_3)$
APEX 2 $(x_2, y_2, c_2)$

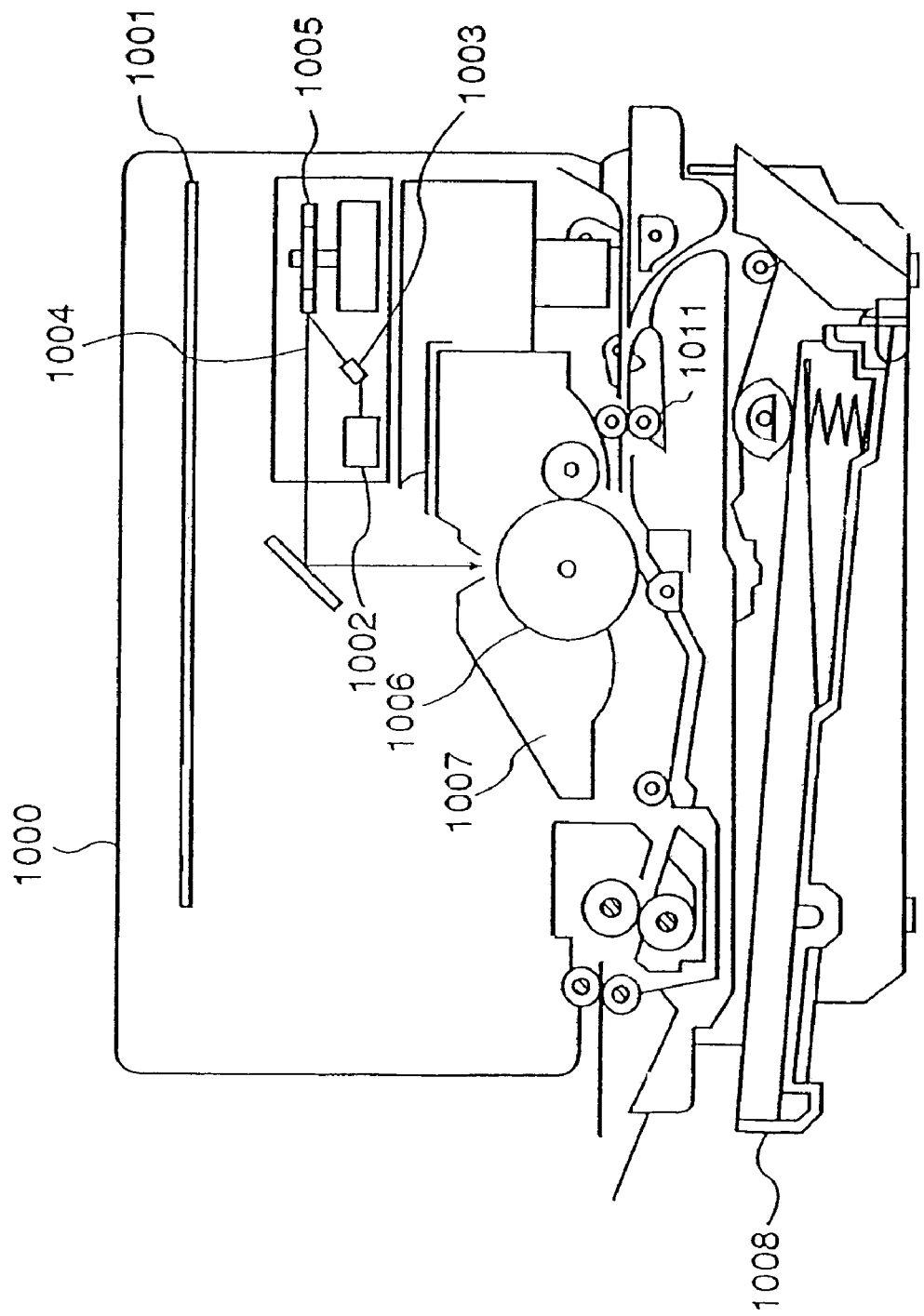

OBJECT HAVING GRADATION
IN HORIZONTAL DIRECTION

HIGH-SPEED GENERATION METHOD OF
GENERATING OBJECT WHICH HAS GRADATION
IN HORIZONTAL DIRECTION AND REPEATS THE
SAME PATTERN IN VERTICAL DIRECTION

OBJECT HAVING GRADATION
IN VERTICAL DIRECTION

HIGH-SPEED GENERATION METHOD OF
GENERATING OBJECT WHICH HAS GRADATION
IN VERTICAL DIRECTION AND REPEATS THE
SAME PATTERN IN HORIZONTAL DIRECTION

FIG. 9A
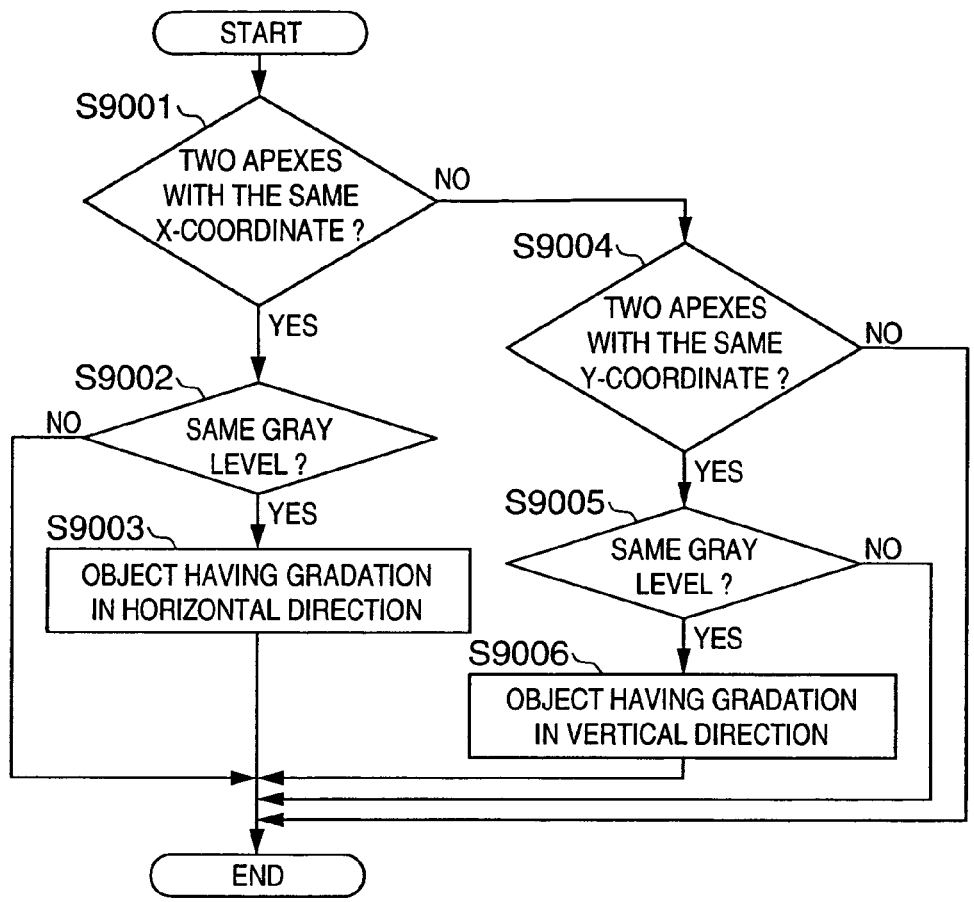
FIG. 9B
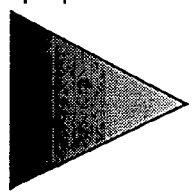
EXAMPLE OF OBJECT WHICH HAS GRADATION IN HORIZONTAL DIRECTION AND TWO APEXES AT THE SAME X-COORDINATE
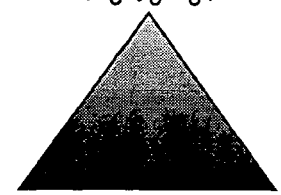
EXAMPLE OF OBJECT WHICH HAS GRADATION IN VERTICAL DIRECTION AND TWO APEXES AT THE SAME Y-COORDINATE

APPARATUS AND METHOD FOR DRAWING A GRADIENT FILL OBJECT

FIELD OF THE INVENTION

The present invention relates to an image processing apparatus and method for rendering image data in units of objects.

BACKGROUND OF THE INVENTION

Some recent data processing systems have a host computer and a printer connected to the host computer through a bi-directional interface (e.g., IEEE1284.4, IEEE1394, or USB). A data processing system using such a printer analyzes output information received from the host computer, bitmaps the information to output data of, e.g., a laser beam printer using a printer engine, and scans and exposes a photosensitive drum with a laser beam modulated on the basis of the bitmap data, thereby printing the image.

A printer having an emulation function is designed to process a plurality of printer control language systems and also to execute printing while switching between the emulation mode and the normal mode in accordance with an application executed by the user. Such a printer has a switch for switching the printer control language or a card slot for switching a circuit board. Many printers can directly print image data from an image input device such as a scanner or digital camera without intervening a host computer. Additionally, along with the recent improvement of processing ability of host computers, various new image processing technologies have been employed. An example is an image processing technology called "gradient fill" for the purpose of filling a predetermined region with smooth grayscale (halftone).

The difference between a conventional drawing technique and the technique of filling a region with grayscale using gradient fill will be described as follows. FIG. 1A is a view showing the conventional technique, in which a plurality of objects with different gray levels are arranged and drawn to express the grayscale in the region. In this conventional technique, to eliminate the steps between the gray levels, a number of objects having different gray levels must be generated. This makes data redundant. If the relationship between the data transfer rate and the printing speed is inappropriate, and a number of objects cannot be generated, discontinuities are formed between gray levels.

FIG. 1B is a view showing gradient fill (a rectangular gradient fill object is used) in which the coordinates and gray levels (8-bit gray levels; 0= black and 255=white) of the rectangle are designated, and the region is filled while calculating the gray levels in units of pixels in the image region. Gradient fill objects include a rectangular gradient fill object which mainly draws predetermined gradation in the horizontal or vertical direction and a triangular gradient fill object which draws predetermined gradation in an arbitrary direction. The triangular gradient fill object can also draw predetermined gradation in the horizontal or vertical directions depending on the position and the manner the colors are given.

A rectangular gradient fill object has, as information, coordinates and gray levels of two points and the gradation direction (horizontal or vertical). The gray level of each pixel of a rectangular gradient fill object can be obtained as follows. As shown on the right side of FIG. 1B, the apex positions are applied to (x, y) coordinates. Letting $(x_1, y_1, c_1)$ be the coordinated and gray level of apex 1, $(x_2, y_2, c_2)$ be the coordinates and gray level of apex 2, and $(x_n, y_n, c_n)$ be the coordinates and gray level of an arbitrary target pixel, predetermine gradation in the horizontal direction is given by $$c_n = (c_2 - c_1)/(x_2 - x_1) \times x_n$$

and predetermined gradation in the vertical direction given by $$c_n = (c_2 - c_1)/(y_2 - y_1) \times y_n$$

FIG. 1C is a view showing a triangular gradient fill object. A triangular gradient fill object has, for information, the coordinates and gray levels of three apexes. When gray levels are designated at three apexes of a triangle, the gradation direction can have a degree of freedom.

The gray level of an arbitrary pixel of the triangular gradient fill object can be obtained by applying gray levels to the three apexes, as in the rectangular gradient fill object, and solving the following simultaneous equations.

$$x_1 \times i + y_1 \times j + k = c_1$$

$$x_2 \times i + y_2 \times j + k = c_2$$

$$x_3 \times i + y_3 \times j + k = c_3$$

The gradation $c_n$ is given by $$c_n = i \times x_n + j \times y_n + k$$

where i, j, and k are coefficients.

A considerable time is required to draw a gradient fill object because the gray levels are obtained in units of pixels using the above equations. However, printing apparatuses have various grayscale expression abilities. If the gray level of each pixel cannot be accurately expressed, halftone expression using a plurality of pixels by dithering or the like is used. In this case, although image data is generated by performing calculation in units of pixels, the grayscale expression of each pixel is not reflected to the printed image, and processing is only time-consuming.

Additionally, in generating a gradient fill object, when gradation having a predetermined pattern in the horizontal or vertical direction should be generated, calculation for each pixel can be omitted by repeatedly using the pattern generated once. In the prior art, however, since calculation is performed for each of all pixels, the processing speed is low.

SUMMARY OF THE INVENTION

The present invention has been made to solve the above problem, and has as its object to provide an image processing method and apparatus which can thin processing pixels in gradient fill object drawing processing by an image processing apparatus, thereby allowing high-speed processing.

It is another object of the present invention to provide an image processing method and apparatus which do not process all pixels in generating an object having gradation with a predetermined pattern in the vertical or horizontal direction, and instead, generates only one pattern and repeatedly uses it to shorten the gradient fill object generation time, thereby allowing high-speed processing.

In order to achieve the above objects, an image processing apparatus according to the present invention has the following arrangement. More specifically, there is provided an image processing apparatus capable of processing a gradient fill object, comprising detection means for detecting whether or not an object is a gradient fill object having gradation in one of horizontal and vertical directions, pixel count detection means for detecting the number of pixels which have almost the same gradation and are consecutively present in a direction perpendicular to the direction of gradation detected by the detection means, and replacement means for replacing, in the direction perpendicular to the direction of gradation, pixels in number equal to the number detected by the pixel count detection means with gradation of a start pixel.

In order to achieve the above objects, an image processing method according to the present invention has the following steps. More specifically, there is provided an image processing method capable of processing a gradient fill object, comprising a detection step of detecting whether or not an object is a gradient fill object having gradation in one of horizontal and vertical directions, the pixel count detection step of detecting the number of pixels which have almost the same gradation and are consecutive in a direction perpendicular to the direction of gradation detected in the detection step, and the replacement step of replacing, in the direction perpendicular to the direction of gradation, pixels in number equal to the number detected in the pixel count detection step with gradation of a start pixel.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a sectional view of a printing apparatus of this embodiment;

FIG. 9A is a flow chart showing processing of determining whether or not a triangular gradient fill object to be used for the second high-speed processing is an object having predetermined gradation in the horizontal or vertical direction; and FIG. 9B is a view for explaining, on the left side, an object having gradation in the horizontal direction and two apexes at the same X-coordinate, and on the right side, an object having gradation in the vertical direction and two apexes at the same Y-coordinate.

DETAILED DESCRIPTION OF THE PREFERRED EMBODIMENT

A preferred embodiment of the present invention will now be described in detail in accordance with the accompanying drawings.

The structure of a laser beam printer (to be referred to as an LBP hereinafter) of this embodiment will be described. The printer to which the present invention is applied is not limited to a laser beam printer, and a printer of any other printing scheme, e.g., an inkjet printer can also be used. In this embodiment, a description will be made by exemplifying a laser beam printer. However, the present invention can also be applied to processing executed by a computer device or printer driver.

FIG. 2 is a sectional view showing the arrangement of an LBP 1000 as an output device of this embodiment. Referring to FIG. 2, the LBP 1000 receives and stores print information (character code and the like), form information, or macro instruction supplied from a host computer externally connected, and also generates a corresponding character pattern or form pattern in accordance with the information, and forms an image on a printing paper sheet as a printing medium. An operation panel (not shown) has switches for operations, LED display device, and the like. A printer control unit 1001 controls the entire LBP 1000, analyzes character information or the like supplied from the host computer (not shown), mainly converts the character information into a video signal of a corresponding character pattern, and outputs the signal to a laser driver 1002.

The laser driver 1002 is a circuit for driving a semiconductor laser 1003 and turns on/off a laser beam 1004 emitted from the semiconductor laser 1003 in accordance with the received video signal. The laser beam 1004 is deflected to the left and right by a rotary polygon mirror 1005 to scan and expose an electrostatic drum 1006. With this operation, the electrostatic latent image of the character pattern is formed on the electrostatic drum 1006. This latent image is developed by a development unit 1007 arranged around the electrostatic drum 1006 and then transferred to a cut printing sheet. The cut printing sheets are stored in a paper cassette 1008 attached to the LBP 1000, sent into the apparatus by paper feed rollers 1011, and supplied to the electrostatic drum 1006. The LBP 1000 also has at least one card slot (not shown) so that an optional font card or control card (emulation card) for a different language system can be connected in addition to the standard font.

Figure 1A:
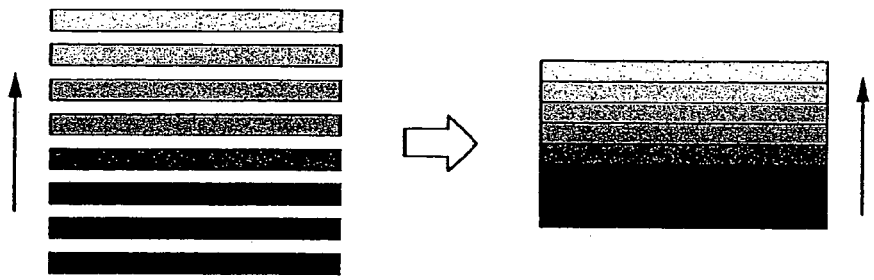
FIG. 1A is a view for explaining a conventional drawing technique of expressing grayscale.
Figure 1B:
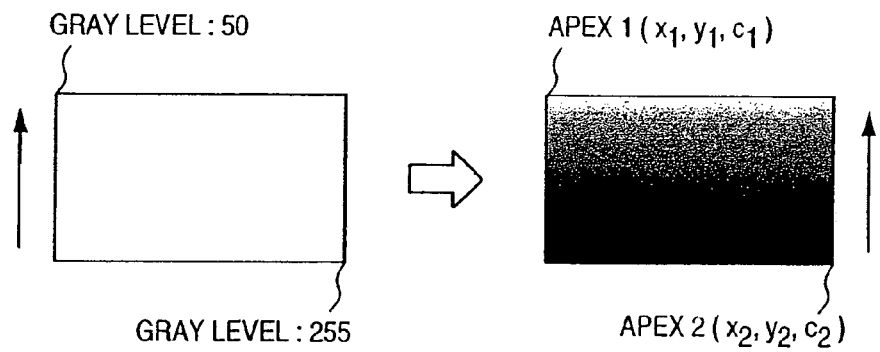
FIG. 1B is a view for explaining a drawing technique of expressing grayscale using rectangular gradient fill in this embodiment.
Figure 1C:
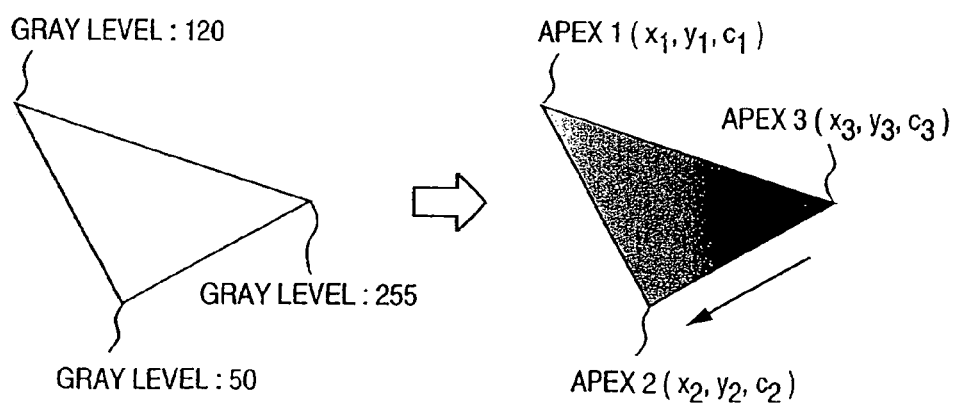
FIG. 1C is a view for explaining a drawing technique of expressing grayscale using triangular gradient fill in this embodiment.
Figure 3:
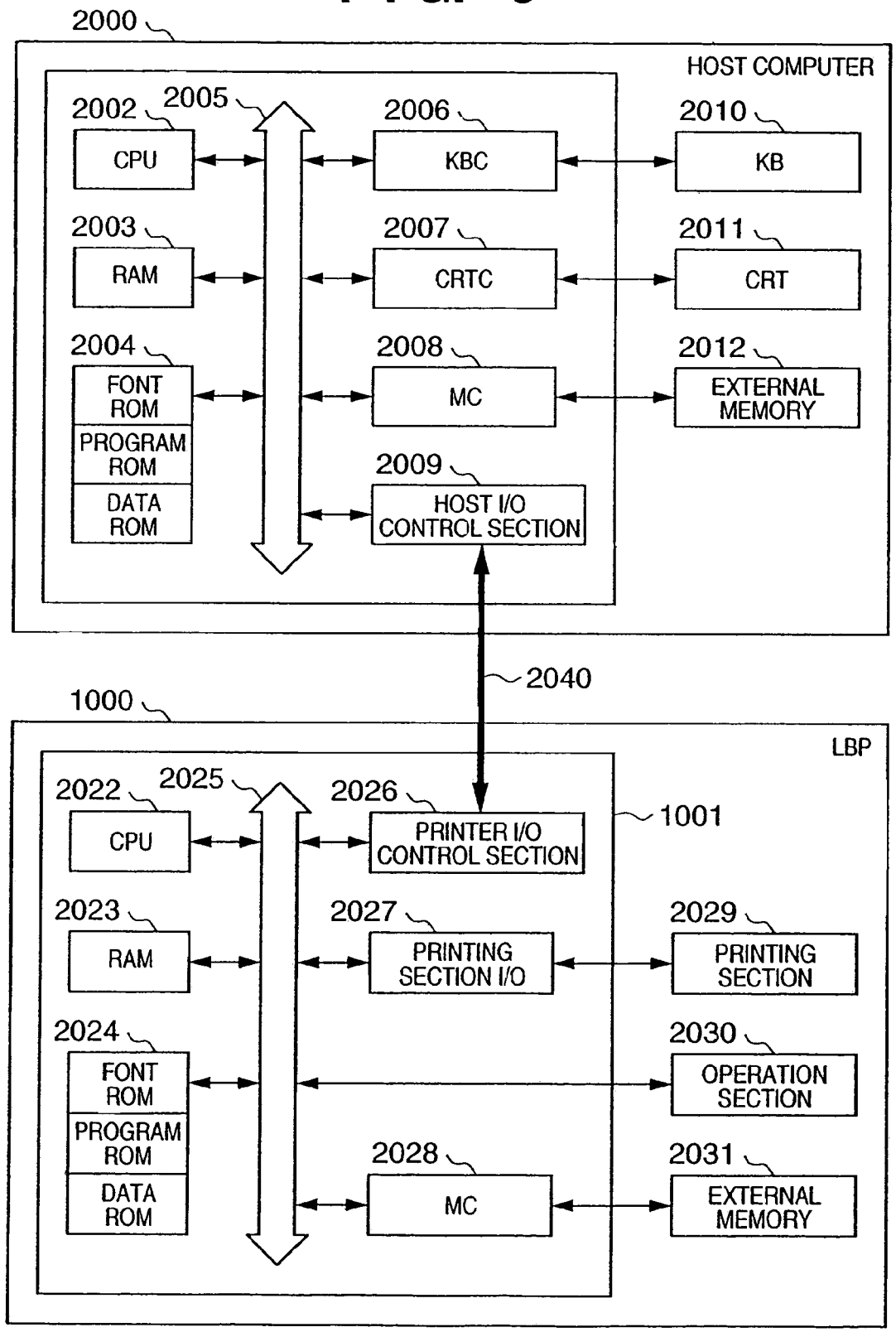
FIG. 3 is a block diagram showing the system arrangement of the printing apparatus of this embodiment.

FIG. 3 is a block diagram for explaining the arrangement of the printer control system of the present invention. The LBP 1000 shown in FIG. 2 will be explained. The present invention can be applied to a single device, a system constructed by a plurality of devices, or a system for performing processing through a network such as a LAN as long as the function of the present invention is executed.

A host computer 2000 shown in FIG. 3 has a CPU 2002 which generates a document having graphics, images, characters, and tables (including spreadsheets) on the basis of a document processing program stored in the program ROM of a ROM 2004. The CPU 2002 systematically controls devices connected to a system device 2005.

The program ROM of the ROM 2004 stores the control program of the CPU 2002, and the like, the font ROM of the ROM 2004 stores font data to be used for document processing, and the data ROM of the ROM 2004 stores various data to be used for document processing. A RAM 2003 functions as a main memory and work area of the CPU 2002. A keyboard controller (KBC) 2006 controls key inputs from a keyboard 2010 or pointing device (not shown). A CRT controller (CRTC) 2007 controls display on a CRT display (CRT) 2011.

A memory controller (MC) 2008 controls access to an external memory 2012 such as a hard disk or floppy disk which stores a boot program, various applications, font data, user files, and editing files. A host I/O control section 2009 and printer I/O control section 2026 control I/O between the devices. These sections control isochronous communication and asynchronous communication. A detained example of these processing sections is an interface such as IEEE 1394. However, an interface of any type can be used as far as it is capable of isochronous communication and asynchronous communication. In this embodiment, information representing whether or not isochronous communication is enabled/disabled is managed by these sections. The remaining processing sections can acquire that information by sending a communication request to the processing sections. Control may be performed using a unique data stack (not shown).

In the LBP 1000 shown in FIG. 3, a printer CPU 2022 systematically controls access to various devices (not shown) connected to a system bus 2025 on the basis of a control program stored in the program ROM of a ROM 2024 or a control program stored in an external memory 2031, and outputs an image signal as output information to a printing section (printer engine) 2029 connected through a printing section interface 2027. The program ROM of the ROM 2024 stores the control program of the CPU 2022, which is represented by flow charts shown in FIGS. 4A and 5 to be described later in detail.

When the printer has no external memory 2031 such as a hard disk, the data ROM of the ROM 2024 stores information to be used on the host computer 2000. The CPU 2022 can communicate with the host computer 2000 through the printer I/O control section 2026 to supply information in the LBP 1000 to the host computer 2000. A RAM 2023 is designed to function as a main memory and work area of the CPU 2022 and expand its memory capacity using an optional RAM (not shown) connected to an add-in port. The RAM 2023 is used to store print data transmitted from the host computer 2000 of this embodiment or bitmap output information, or as an environment data storage area or NVRAM.

Access to the above-described external memory 2031 such as a hard disk or IC card is controlled by a memory controller (MC) 2028. A transmission buffer in this embodiment is also prepared in this portion. The external memory 2031 is connected as an option to store font data, emulation program, form data, and the like. An operation section 2030 has switches for operations and LED display device. At least one external memory 2031 can be prepared to connect a plurality of optional cards or external memories 2031 which store programs for interpreting printer control language of different language systems in addition to the internal font. Furthermore, an NVRAM (not shown) can be prepared to store printer mode setting information from the operation section 2030.

[First High-Speed Processing: Rectangular Gradient Fill Object]

First high-speed processing will be described next, in which high-speed processing by thinning for a gradient fill object according to the ability of the printing apparatus, and high-speed generation processing of a gradient fill object having predetermined gradation in the vertical or horizontal direction are performed using the LBP 1000. The first high-speed processing will be described using a rectangular gradient fill object as shown in FIGS. 4A to 8.

The first high-speed processing employs a general scheme of the processing system of a printing apparatus, i.e., a scheme of processing data in units of lines. The thinning unit depends on the dither size. However, the thinning unit may depend on another factor. Thinning is performed only in the horizontal direction. However, thinning may be performed in the vertical direction. In this case, processing of copying the same line in correspondence with the dither size is added.

Figure 4A:
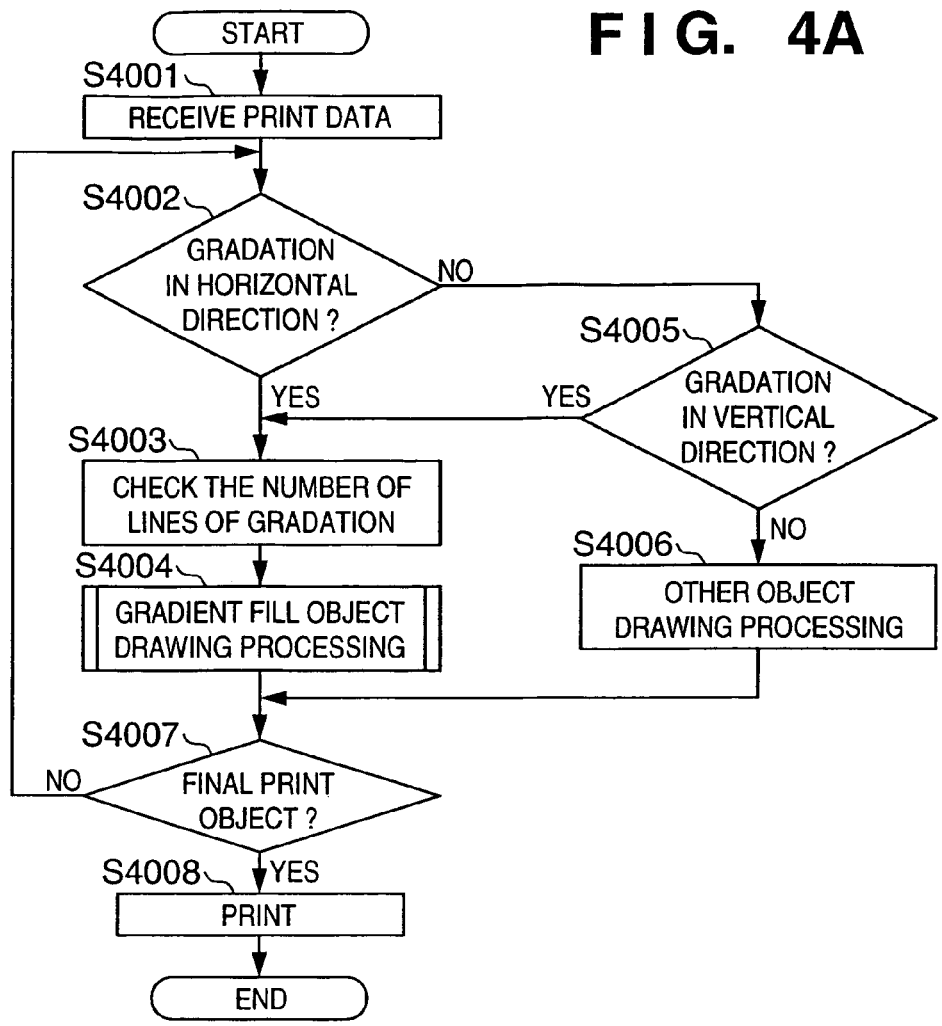
FIG. 4A is a flow chart showing drawing processing of expressing grayscale of a gradient fill object in the first high-speed processing.

FIG. 4A is a flow chart showing the entire flow from reception of print data containing a gradient fill object from the host computer 2000 to printing by the LBP 1000. First, in step S4001, print data is received from the host computer 2000. The flow advances to step S4002 to check if print objects contained in the print data include an object having gradation in the horizontal direction.

Figure 4B:
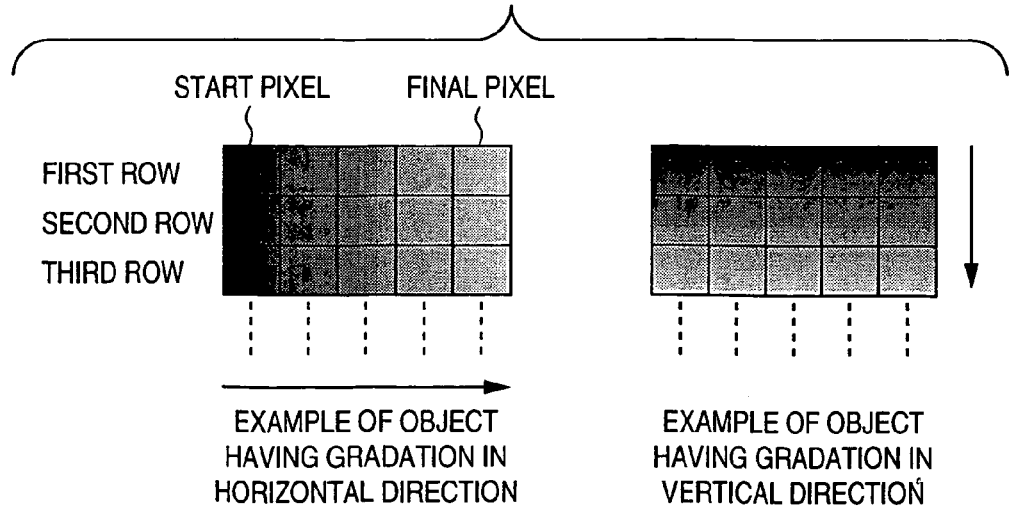
FIG. 4B is a view showing an object having gradation in the horizontal or vertical direction.

If YES in step S4002, i.e., when the grayscale of pixels increases or decreases at a predetermined rate from the start pixel to the final pixel of the same line, as shown on the left of FIG. 4B, the flow advances to step S4003 to check the vertical number of consecutive lines having gradation patterns almost the same as the above gradation pattern. In step S4004, gradient fill drawing processing is performed, and then, the flow advances to step S4007. The gradient fill drawing processing in step S4004 will be described in detail with reference to FIG. 5, and a detailed description thereof will be omitted here.

If NO in step S4002, it is checked in step S4005 whether or not the object has gradation in the vertical direction. If YES in step S4005, i.e., when the grayscale of pixels of the same (within defined range, ±gray level) column increases or decreases at a predetermined rate from the first row to the final row, as shown on the right of FIG. 4B, the flow advances to step S4003 to check the horizontal number of consecutive lines having gradation patterns almost (within defined range, ±gray level) the same as the above gradation pattern. Then, in step S4004, gradient fill drawing processing is performed, and the flow advances to step S4006.

If NO in step S4005, the flow advances to step S4006 to execute normal object drawing processing, and the flow advances to step S4007. In step S4007, it is determined whether or not drawing processing of all print objects has ended. When drawing processing of the final print object has ended, the flow advances to step S4008 to print, and the series of processing operations end. On the other hand, when drawing processing of the final print object has not ended, the flow returns to step S4002 to continuously perform print object drawing processing.

Figure 5:
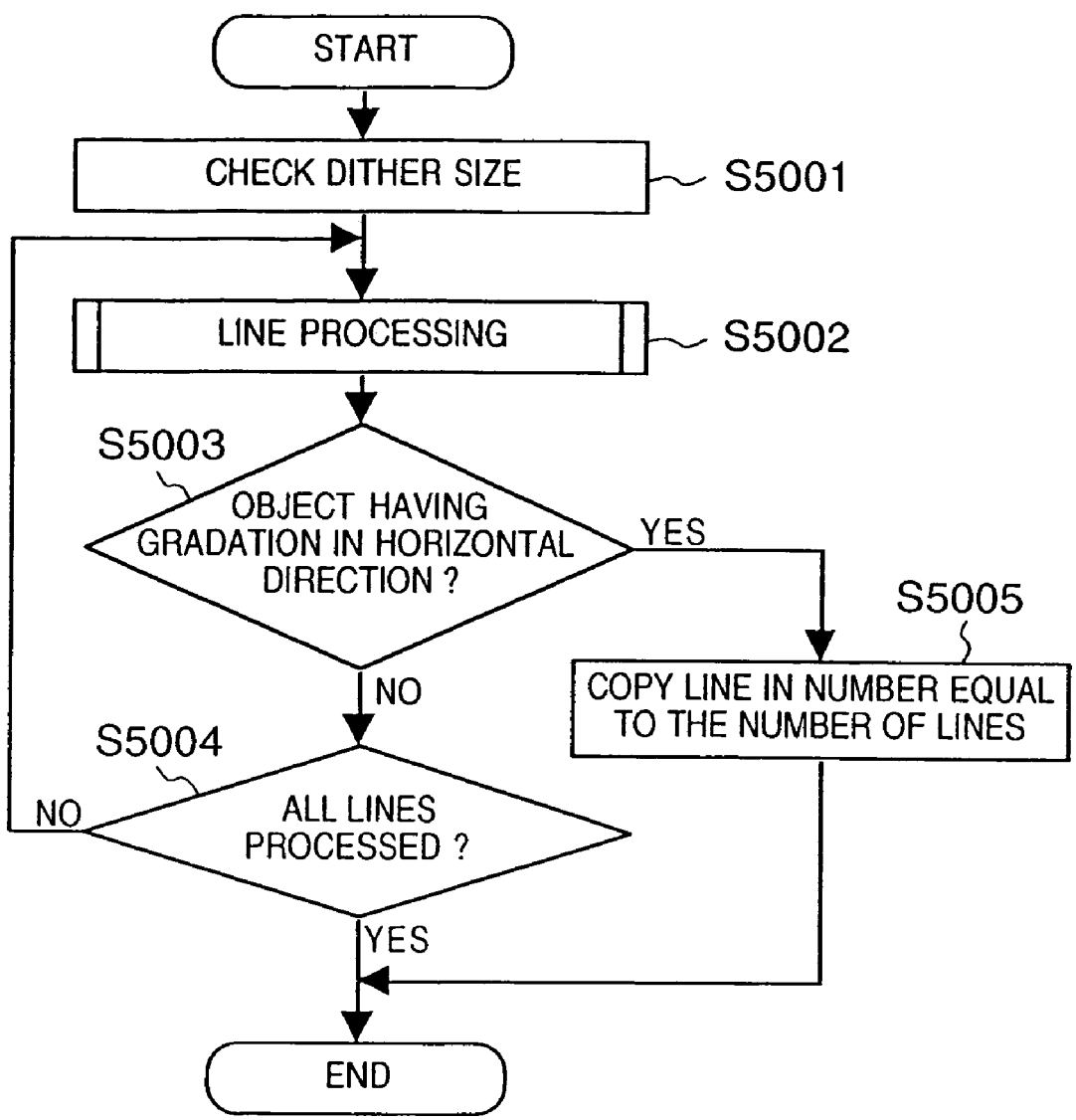
FIG. 5 is a flow chart showing processing in units of lines in drawing processing of expressing grayscale using the gradient fill object in the first high-speed processing.

FIG. 5 is a flow chart showing the detailed flow of gradient fill object drawing processing in step S4003 shown in FIG. 4. First, in step S5001, the dither size is checked. The dither size means the number of pixels used to express halftone. The flow advances to step S5002 to perform 1-line processing including thinning. The 1-line processing including thinning in step S5002 will be described in detail with reference to FIGS. 6A and 6B, and a detailed description thereof will be omitted here.

It is determined in step S5003 whether or not the gradient fill object has gradation in the horizontal direction. If YES in step S5003, the flow advances to step S5005. In step S5005, the line generated in step S5002 is copied in necessary number of lines as second and subsequent lines.

The processing method in steps S5003 to S5005, i.e., processing method used when the object has gradation in the horizontal direction, and the same gradation pattern repeatedly appears in the vertical direction will be described in detail with reference to FIGS. 6A and 6B.

Figure 6A:
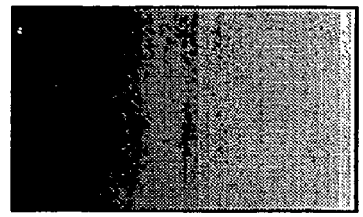
FIG. 6A is a view showing an object having gradation in the horizontal direction in the first high-speed processing.
Figure 6B:
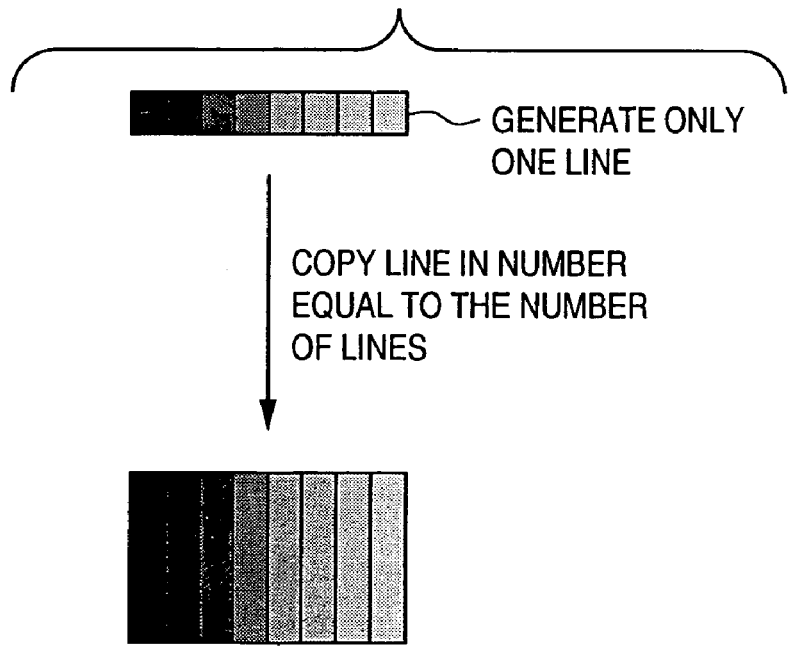
FIG. 6B is a view showing a high-speed generation method of an object which has gradation in the horizontal direction and repeats the same pattern in the vertical direction.

FIG. 6A is a view of a gradient fill object for which it is determined that it has gradation in the horizontal direction, and this gradation pattern repeatedly appears in the vertical direction. In this case, as shown on the upper side of FIG. 6B, the pixels of the first line are calculated. The drawing data of calculated line can be copied in the necessary number of lines and used for all the subsequent lines. The contents of copy processing executed in step S5005 have been described.

If NO in step S5003, the flow advances to step S5004. In step S5004, it is checked if processing for all lines has ended. If YES in step S5004, the drawing processing has ended. If NO in step S5005, the flow returns to step S5002 to continue line processing.

Figure 7:
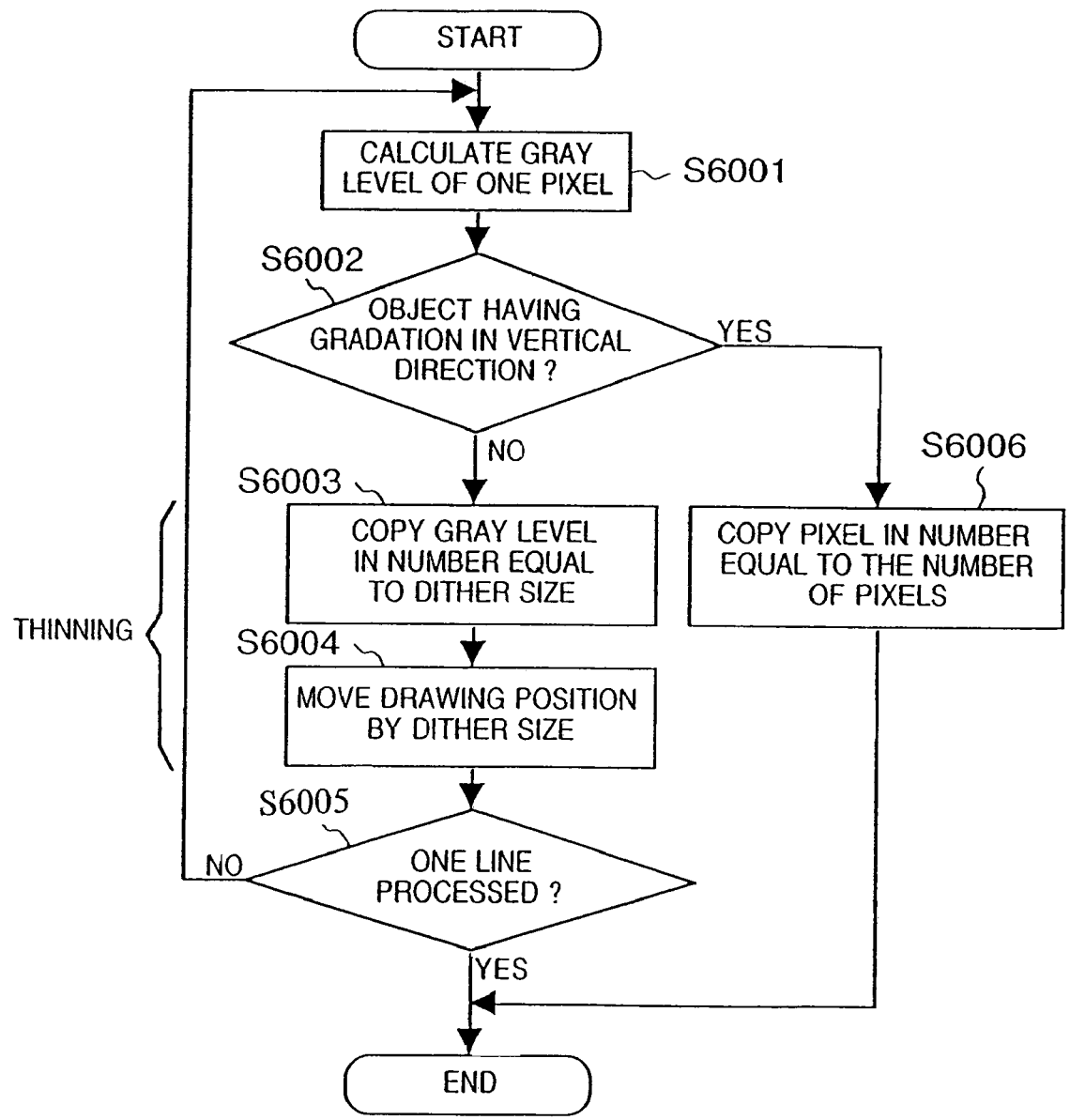
FIG. 7 is a flow chart showing details of the flow of processing pixel thinning in the first high-speed processing, and high-speed processing of an object having gradation in the vertical direction.

FIG. 7 is a flow chart showing details of line processing in step S5002 of FIG. 5. First, in step S6001, the start pixel of one line is calculated. The flow advances to step S6002 to check if the gradient fill object to be drawn is an object having gradation in the vertical direction. If YES in step S6002, the flow advances to step S6006 to copy the start pixel calculated in step S6001 in number equal to the number of pixels of one line.

Figure 8A:
FIG. 8A is a view showing an object having predetermined gradation in the vertical direction in the first high-speed processing.

The processing method in steps S6002 to S6006, i.e., the processing method used when the object has gradation in the vertical direction, and the same gradation pattern repeatedly appears in the horizontal direction will be described in detail with reference to FIGS. 8A and 8B. FIG. 8A is a view of a gradient fill object for which it is determined that it has gradation in the vertical direction, and this gradation pattern repeatedly appears in the horizontal direction.

Figure 8B:
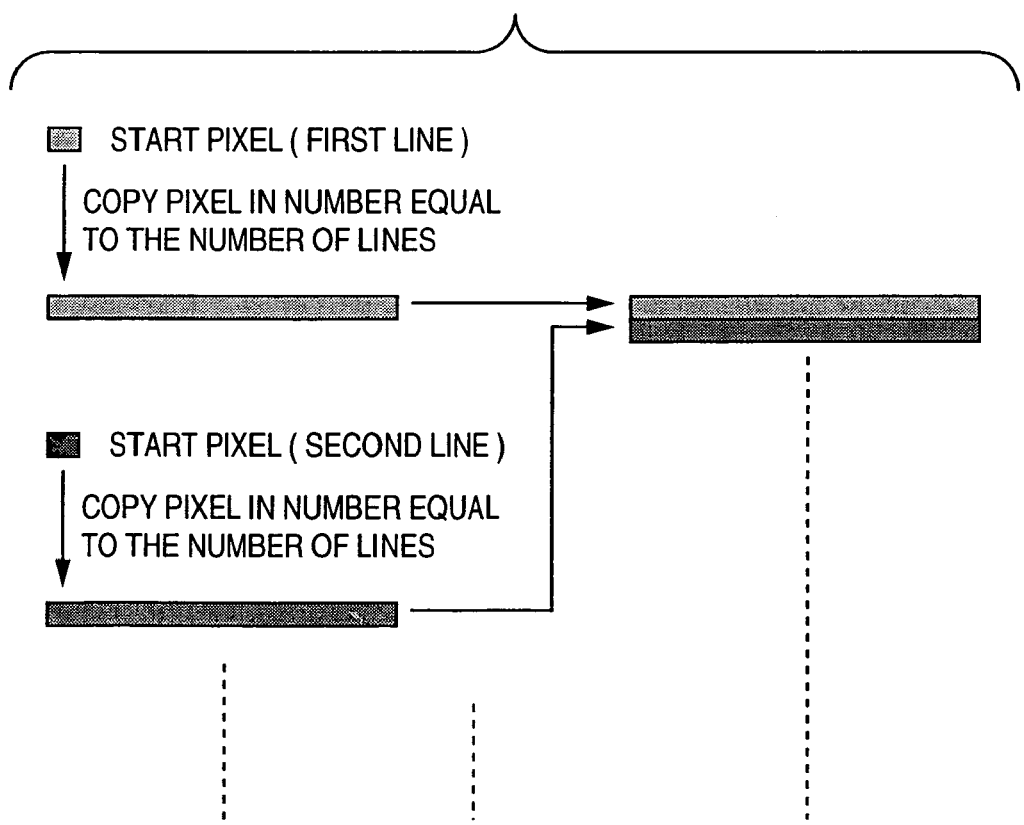
FIG. 8B is a view showing a high-speed generation method of an object which has gradation in the vertical direction and repeats the same pattern in the horizontal direction.

When pixels arrayed in the horizontal direction have the same gray level, first, only the start pixel of the first line is calculated and generated, and the generated start pixel is copied in number equal to the number of pixels of one line and used, as shown on the upper side of FIG. 8B, thereby drawing the first line. In a similar way, only the start pixel of the second line is calculated and generated, and the generated start pixel is copied in number equal to the number of pixels of one line and used, thereby drawing the second line. When this drawing processing is executed for all lines having the same gray levels, a gradient fill object having predetermined gradation in the horizontal direction shown in FIG. 8A can be formed.

If NO in step S6002, the flow advances to step S6003 to perform thinning. More specifically, in step S6003, the gray level of one pixel, which is obtained in step S6001, is copied by the dither size. Next in step S6004, the drawing position is moved by the number of copied pixels to perform thinning of one cycle. The flow advances to step S6005 to check if processing for one line is ended. If NO in step S6005, the flow returns to step S6001 to continuously calculate one pixel. If YES in step S6005, the processing is ended.

[Second High-Speed Processing: Triangular Gradient Fill Object]

As described by prior art, a rectangular gradient fill object allows the first high-speed processing because it has predetermined gradation in the horizontal or vertical direction. A triangular gradient fill object can also have predetermined gradation in the horizontal or vertical direction.

For a triangular gradient fill object used in the second high-speed processing to be described below, the positions and gray levels of apexes are determined to select a triangular gradient fill object having predetermined gradation in the horizontal or vertical direction whereby the high-speed processing described for the first high-speed processing can be applied to even a triangular gradient fill object.

FIG. 9A is a flow chart showing the flow of processing of determining whether a triangular gradient fill object has predetermined gradation in the horizontal or vertical direction. Assume that the triangular gradient fill object is applied to the X-Y-C coordinate system and has position coordinates (x, y) and gray level (c), as shown in FIG. 3.

First, in step S9001, it is determined whether or not the triangular gradient fill object has two apexes at the same X-coordinate. If YES in step S9001, the flow advances to step S9002 to determine whether or not the two apexes have the same gray level. If YES in step S9002, the flow advances to step S9003 to determine that the triangular gradient fill object is an object having gradation in the horizontal direction, as shown on the left of FIG. 9B. If NO in step S9002, it is determined that the triangular gradient fill object is not an object having predetermined gradation in the horizontal direction, and the processing is ended.

If NO in step S9001, the flow advances to step S9004. In step S9004, it is determined whether or not the triangular gradient fill object has two apexes at the same Y-coordinate. If YES in step S9004, the flow advances to step S9005 to check if the two apexes have the same gray level.

If YES in step S9005, the flow advances to step S9006 to determine that the triangular gradient fill object is an object having gradation in the vertical direction, as shown on the right of FIG. 9B. If NO in step S9005, it is determined that the triangular gradient fill object is not an object having predetermined gradation in the vertical direction, and the processing is ended. If NO in step S9004, it is determined that the triangular gradient fill object is not an object having predetermined gradation in either horizontal or vertical direction, and the processing is ended.

In the above-described determination processing, the order of X-coordinate determination and Y-coordinate determination may be reversed. In the above-described processing, an object having three points with the same gray level or an object having two points with the same coordinates cannot be determined. If such an object is drawn using the gradient fill object, the processing speed becomes low. To prevent this, in this embodiment using the host computer 2000 and LBP 1000, an object having three points with the same gray level or an object having two points with the same coordinates is drawn as another appropriate object (e.g., a simple image data object).

As has been described above, according to the present invention, in the gradient fill object drawing processing, high-speed processing can be executed without degrading the image quality by thinning processing pixels. In addition, in generating an object having predetermined gradation in the vertical or horizontal direction, instead of processing all pixels, only one pattern is generated and repeatedly used, thereby shortening the gradient fill object generation time and allowing high-speed processing.

The printing apparatus of this embodiment can be provided as a separate or integrated image output terminal of an information processing device such as a computer, or take a form of a copying machine combined with a reader or a facsimile apparatus having transmission and reception functions.

The present invention can be applied to a system constituted by a plurality of devices including a host computer, interface device, reader, and printer or a stand-alone apparatus such as a copying machine or facsimile apparatus.

The present invention can also be applied to a case wherein a storage medium storing software program codes for realizing the functions of the above-described embodiment is supplied to a system or apparatus, and the computer (or a CPU or an MPU) of the system or apparatus reads out and executes the program codes stored in the storage medium.

In this case, the program codes read out from the storage medium realize the functions of the above-described embodiment by themselves, and the storage medium storing the program codes constitutes the present invention.

As a storage medium for supplying the program codes, for example, a floppy disk, hard disk, optical disk, magnetooptical disk, CD-ROM, CD-R, magnetic tape, nonvolatile memory card, ROM, or the like can be used.

The functions of the above-described embodiment are realized not only when the readout program codes are executed by the computer but also when the OS (Operating System) running on the computer performs part or all of actual processing on the basis of the instructions of the program codes.

The functions of the above-described embodiment are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus capable of drawing a gradient fill object defined by at least two apexes each having coordinate data and gray level value, said gradient fill object being described as a print object capable of being interpreted by the image processing apparatus, comprising:
   detection means for detecting whether or not an object is a gradient fill object having gradation in a horizontal or vertical direction, by interpreting the print object;
   pixel count detection means for detecting, by interpreting the print object, a number of pixels which have substantially the same gray level value and are consecutively present in a direction perpendicular to the direction of gradation detected by said detection means;
   drawing means for drawing at least one pixel for different gray level values in the direction of gradation, based on the coordinate data and gray level value of the gradient fill object; and
   replication means for replicating, in the direction perpendicular to the direction of gradation, the pixels drawn by said drawing means in a number equal to the number of pixels detected by said pixel count detection means, wherein said replication means divides the pixels which have gradation and are consecutively present in the same row or same column into a plurality of pixel groups each including an equal number of pixels, and, in each pixel group belonging to the plurality of pixel groups, draws a first pixel belonging to each respective pixel group at a gray level value and replicates the gray level value of the first pixel for all pixels belonging to each respective pixel group.

2. An image processing method capable of drawing a gradient fill object defined by at least two apexes each having coordinate data and gray level value, the gradient fill object being described as a print object capable of being interpreted by an image processing apparatus, comprising:
   a detection step, of detecting whether or not an object is a gradient fill object having gradation in a horizontal or vertical direction, by interpreting the print object;
   a pixel count detection step, of detecting, by interpreting the print object, the number of pixels which have substantially the same gray level value and are consecutively present in a direction perpendicular to the direction of gradation detected in the detection step;
   a drawing step, of drawing at least one pixel for different gray level values in the direction of gradation, based on the coordinate data and gray level value of the gradient fill object; and
   a replication step, of replicating, in the direction perpendicular to the direction of gradation, the pixels drawn in said drawing step in a number equal to the number detected in said pixel count detection step, wherein said replication step comprises the steps of dividing the pixels which have gradation and are consecutively present in the same row or same column into a plurality of pixel groups each including an equal number of pixels, and, in each pixel group belonging to the plurality of pixel groups, drawing a first pixel belonging to each respective pixel group at a gray level value and replicating said gray level value of the first pixel for all pixels belonging to each respective pixel group.

3. An image processing method of drawing a gradient fill object defined by at least two apexes, each having coordinate data and gray level value, comprising the steps of:
   judging whether or not an object is a gradient fill object having gradation in a horizontal direction or vertical direction; and
   drawing the object by drawing at least one pixel for different gray level values in a plurality of pixels of the object and replicating the at least one drawn pixel for pixels having substantially the same gray level value as that of the at least one drawn pixel, when it is judged that the object is a gradient fill object having a gradation in a horizontal direction or a vertical direction.

4. An image processing method of drawing a gradient fill object defined by at least two apexes each having coordinate data and gray level value, comprising the steps of:
   judging whether or not an object is a gradient fill object having gradation in a horizontal direction; and
   drawing the object by drawing pixels in a line in a horizontal direction based on the coordinate data and gray level value, reproducing the line of drawn pixels, and arranging the lines of drawn pixels in a vertical direction, when it is judged that the object is a gradient fill object having gradation in the horizontal direction.

5. An image processing method of drawing a gradient fill object defined by at least two apexes, each having coordinate data and gray level value, comprising the steps:

judging whether or not an object is a gradient fill object having gradation in a vertical direction; and drawing the object by drawing at least one pixel of a line having substantially the same gray level value in a horizontal direction, replicating the at least one drawn pixel a number of times equal to a number of pixels of the line, and repeating the drawing and replicating a number of times equal to a number of lines in the object, when it is judged that the object is a gradient fill object having gradation in the vertical direction.

* * * * *

UNITED STATES PATENT AND TRADEMARK OFFICE
CERTIFICATE OF CORRECTION

| | | |
|---|---|---|
| PATENT NO. | : 6,985,260 B1 | Page 1 of 1 |
| APPLICATION NO. | : 09/668459 | |
| DATED | : January 10, 2006 | |
| INVENTOR(S) | : Shuji Ozawa | |

It is certified that error appears in the above-identified patent and that said Letters Patent is hereby corrected as shown below:

[54] TITLE:

"APPARATUS AND METHOD FOR DRAWING A GRADIENT FILL OBJECT" should read --IMAGE PROCESSING APPARATUS AND METHOD--.

COLUMN 1:

Lines 1 and 2, "APPARATUS AND METHOD FOR DRAWING A GRADIENT FILL OBJECT" should read --IMAGE PROCESSING APPARATUS AND METHOD--.
Line 28, "intervening" should read --interposing--.
Line 67, "coordinated" should read --coordinates--.

COLUMN 5:

Line 28, "detained" should read --detailed--.

Signed and Sealed this

First Day of July, 2008

JON W. DUDAS
*Director of the United States Patent and Trademark Office*